United States Patent [19]
Hasegawa

[11] Patent Number: 5,835,308
[45] Date of Patent: Nov. 10, 1998

[54] INTEGRALLY MOLDED DISK DEVICE ACTUATOR WITH GROUND PATH

[75] Inventor: Hitoshi Hasegawa, Iruma, Japan

[73] Assignees: Nittoku Engineering Kabushiki Kaisha; Nittoku Giken Kabushiki Kaisha, both of Saitama, Japan

[21] Appl. No.: 662,802

[22] Filed: Jun. 12, 1996

[30] Foreign Application Priority Data

Jun. 15, 1995 [JP] Japan .................................. 7-149097

[51] Int. Cl.⁶ ...................................................... G11B 5/48
[52] U.S. Cl. ............................................................ 360/104
[58] Field of Search ..................................... 360/104–106

[56] References Cited

U.S. PATENT DOCUMENTS 5,631,788  5/1997  Richards .................................. 360/104
5,650,896  7/1997  Viskochil ................................. 360/106

FOREIGN PATENT DOCUMENTS 4229062  8/1992  Japan .

*Primary Examiner*—A. J. Heinz
*Attorney, Agent, or Firm*—Jordan and Hamburg

[57] ABSTRACT

An actuator for a magnetic head of a disk device has a rotating arm constructed of resin. The arm is supported rotatably in a housing on an electrically conducting shaft, and a magnetic head supported by a supporting member at one end of the arm is moved to various positions above the magnetic disk when the arm is rotated by a rotating mechanism. An electrically conducting mechanism conducts static electricity from the supporting member of the magnetic head to the shaft so that static electricity is prevented from accumulating on the head supporting member of the resin arm or in its vicinity.

9 Claims, 7 Drawing Sheets

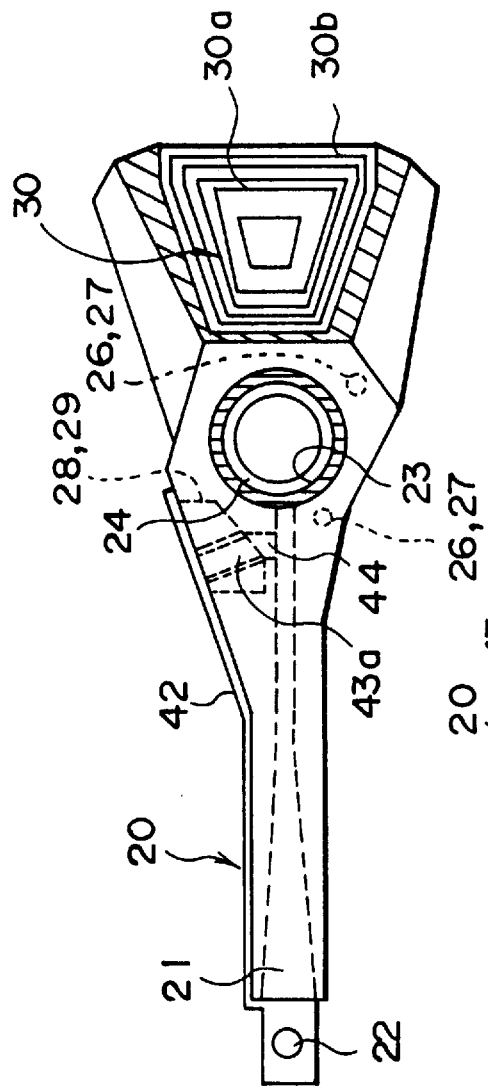
FIG. IA
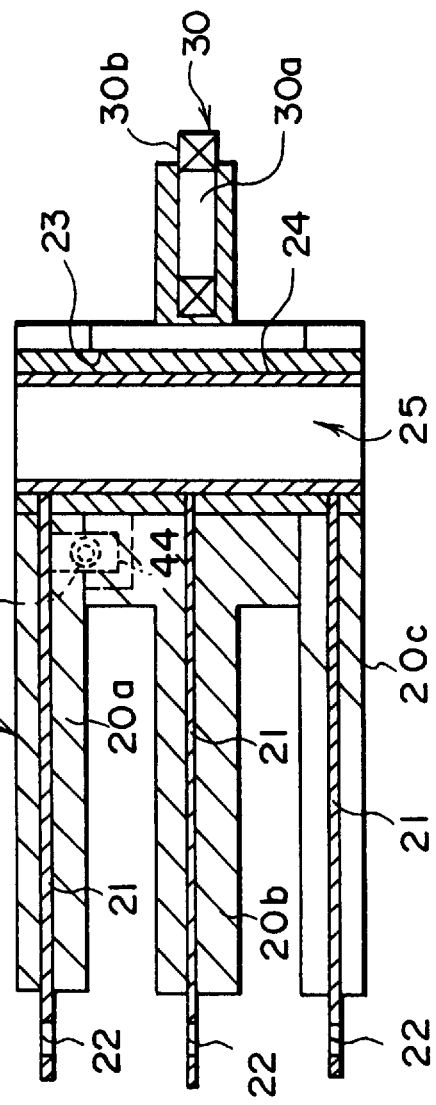
FIG. IB

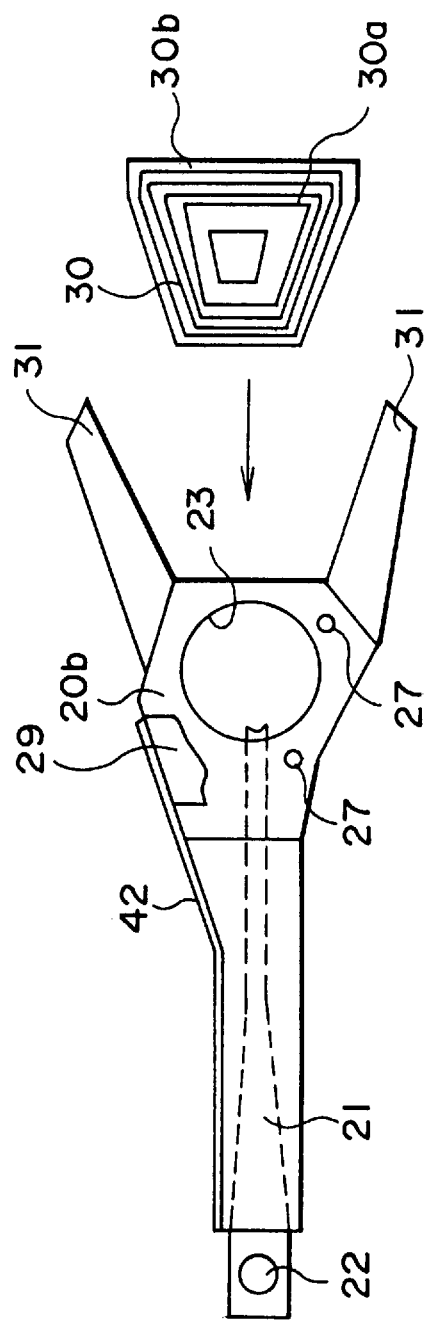
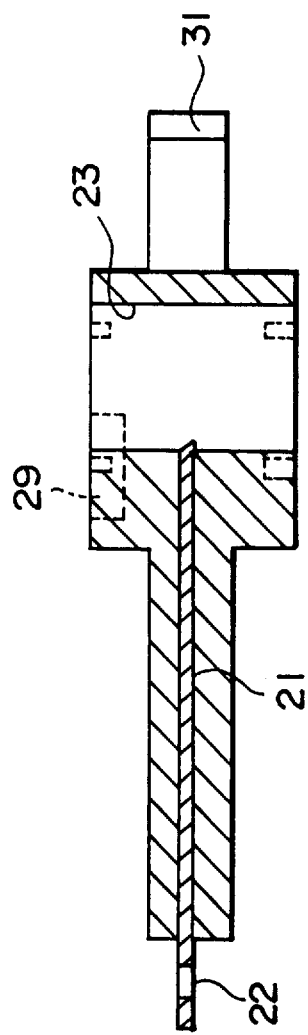
FIG. 5A
FIG. 5B

INTEGRALLY MOLDED DISK DEVICE ACTUATOR WITH GROUND PATH

BACKGROUND OF THE INVENTION

This invention relates to a swing type actuator which drives a magnetic head in a magnetic disk device or the like.

Swing type actuators used in magnetic disk devices, for example, comprise an arm which pivots about a base, a magnetic head fixed to a tip of the arm, a coil attached to a base of the arm, and magnets facing both sides of the coil.

When the coil is energized, a magnetic force acts between the coil and magnets according to Fleming's left-hand rule, and this force displaces the magnetic head to a predetermined position on a magnetic disk.

The arm is, for example, made of diecast aluminum alloy. However, diecast arms are heavy, and it is difficult to make the coil-magnet drive combination more compact.

To resolve this problem, Tokkai Hei 4-229062, published by the Japanese Patent Office in 1992, proposes a one-piece construction wherein the arm and a coil holder provided on the arm are made of a thermoplastic resin.

However, in such a resin arm, static electricity is generated between the arm and the magnetic disk rotating at high speed. This static electricity tends to charge the arm's magnetic head support and surrounding parts, and therefore led to read/write errors of the magnetic head.

SUMMARY OF THE INVENTION

It is therefore an object of the present invention to prevent charging of a resin arm by static electricity in an actuator for driving a magnetic head.

It is a further object of the present invention to make an actuator for driving a magnetic head more compact.

In order to achieve the above objects, the invention provides an actuator which rotates a magnetic head of a disk device, comprising an electrically conducting shaft which supports an arm free to rotate about an axis in a housing, a supporting member for a magnetic head provided at a tip of the arm, a mechanism for rotating the arm, and a mechanism for electrically conducting static electricity from the supporting member to the conducting shaft.

It is preferable that the conducting mechanism comprises a metal sleeve provided in the arm so as to form a bearing at the axis, and an electrically conducting plate which electrically connects the supporting member with the sleeve.

It is also preferable that the conducting mechanism comprises a metal sleeve provided in the arm so as to form a bearing at the axis, and a metal film provided on the surface of the arm so as to connect the supporting member with the sleeve.

It is also preferable that the arm comprises a flexible printed circuit for relaying a detection signal from the magnetic head, and a screw mechanism for electrically connecting the flexible printed circuit with the conducting mechanism. In such an embodiment, it is further preferable that the screw mechanism has a further function of fixing the flexible printed circuit to the arm.

The details as well as other features and advantages of the invention are set forth in the remainder of the specification and are shown in the accompanying drawings.

BRIEF DESCRIPTION OF THE DRAWINGS

FIG. 1A is a plan view of an arm according to the present invention.

FIG. 1B is a vertical sectional view of the arm.

FIG. 5A is a plan view of a middle resin plate of the arm.

FIG. 5B is a sectional view of the middle resin plate.

DETAILED DESCRIPTION OF THE INVENTION

Figure 2:
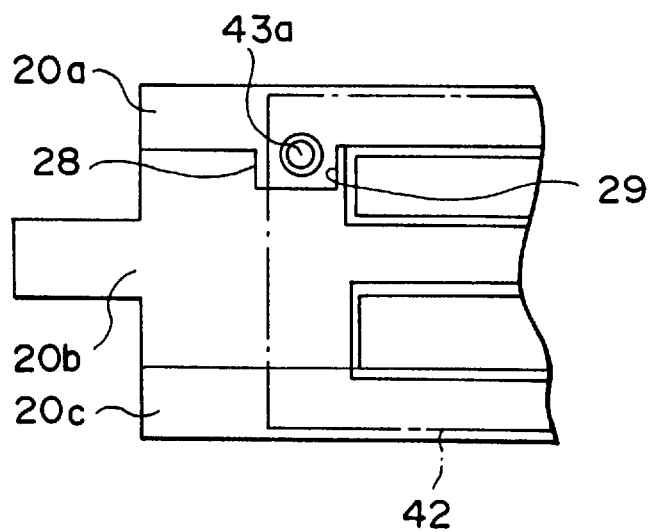
FIG. 2 is a lateral view of a fixed part of a flexible printed plate according to the present invention.

Referring to FIGS. 1A and 1B of the drawings, a resin arm 20 of an actuator which drives a magnetic head of a disk device comprises three superposed resin plates 20a–20c. Each of the plates 20a–20c includes an electrically conducting plate 21 inside it and is formed by injecting a thermoplastic resin into a mold so as to surround the plate 21. One end of each of the plates 21 projects from the resin plates 20a–20c, and fixing holes 22 for fixing a magnetic head are formed in the projecting ends. An axial hole 23 is formed at a predetermined position in the resin arm 20. The other ends of the plates 21 project some distance inside the axial hole 23.

When the plates 20a–20c are superposed, a sleeve 24, having a radius slightly less than the axial hole 23 and constructed of a metal such as stainless steel or the like, is disposed inside the hole 23 such that it comes in contact with the ends of the plates 21. Hence, by injecting thermoplastic resin between the sleeve 24 and the resin arm 20, the sleeve 24 and resin arm 20 are formed as a one-piece construction. The sleeve 24 comprises a bearing 25 for a conducting shaft, defining an axis, which is fixed to a housing of the disk device.

The resin arm 20 is supported free to pivot in the housing about the conducting shaft. The sleeve 24 protects the wall of the axial hole 23 in the thermoplastic resin, thereby assuring durability and reliability of the resin arm 20. The other ends of the plates 21 at the side of the hole 23 are wedge-shaped so that they can dig into the outer circumference of the sleeve 24. In this way, the plates 21 and sleeve 24 are firmly connected.

Figure 3:
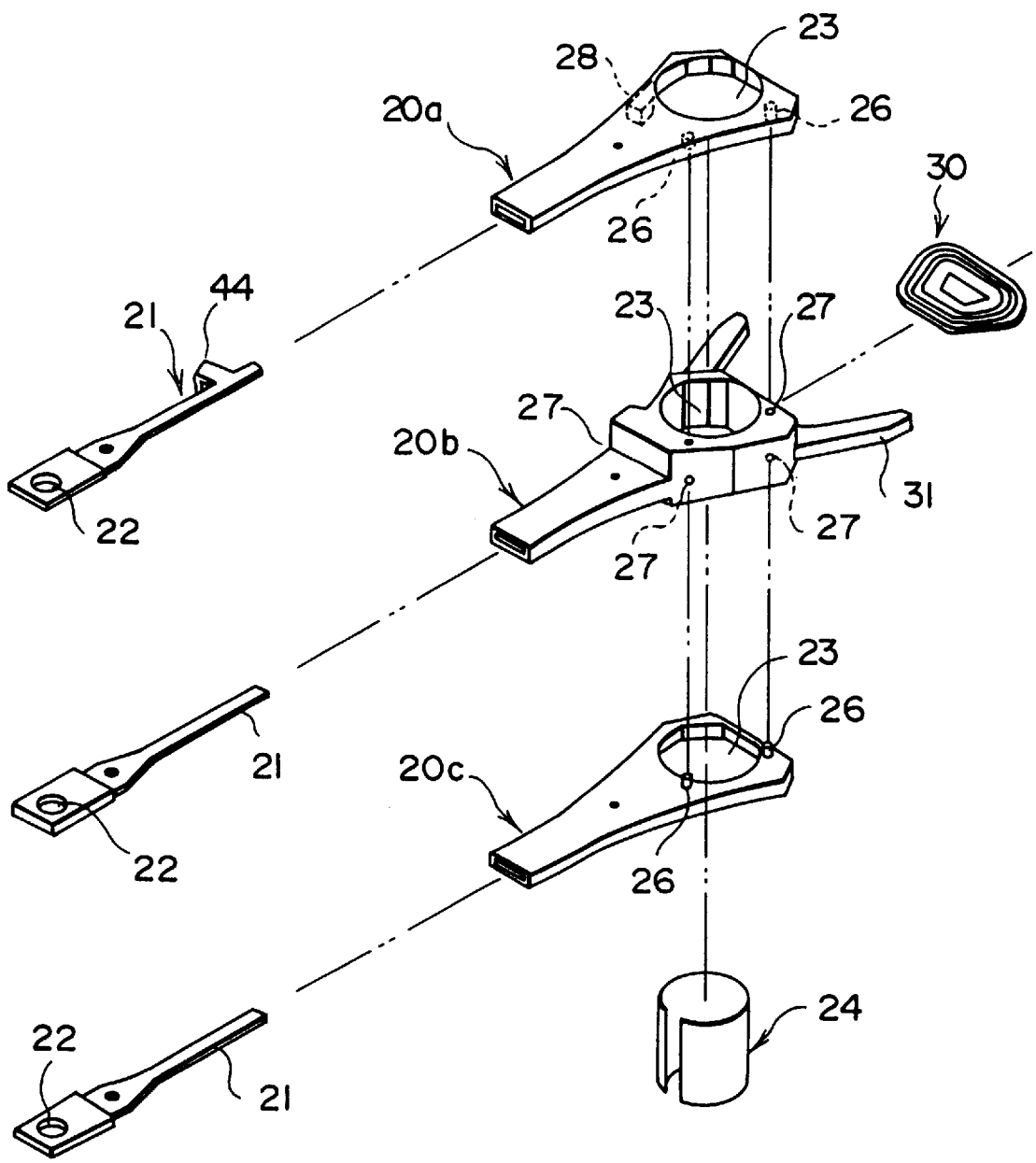
FIG. 3 is a perspective view of component parts of the arm.
Figure 4A:
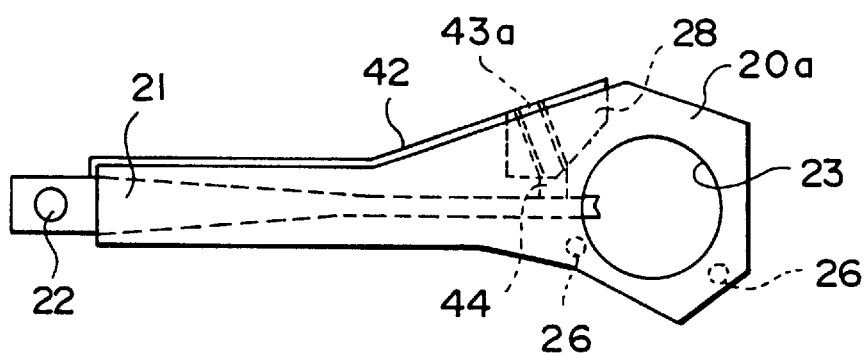
FIG. 4A is a plan view of an upper resin plate of the arm.
Figure 4B:
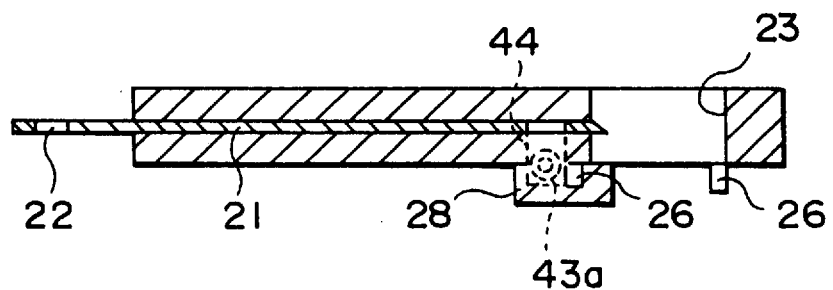
FIG. 4B is a vertical sectional view of the upper resin plate.

As shown in FIG. 3, in the three layer construction comprising the upper plate 20a, middle plate 20b and lower plate 20c of the resin arm 20, a positioning pin 26 and engaging holes 27 are formed in joint surfaces. The magnetic head, not shown, is attached to the fixing holes 22 in the plates 21 which project from the plates 20a–20c. A detection signal of the magnetic head is input to a control circuit of the disk device via a flexible printed circuit 42 shown in FIG. 1. The flexible printed circuit 42 is fixed by a plurality of screws, not shown, to a side of the resin arm 20. A projection 28, oriented downwards, is formed in the upper plate 20a of the resin arm 20 as shown in FIGS. 2 and 4B. A screw hole 43a is formed in the projection 28 extending from a surface of the printed circuit 42 to the plate 21 as shown in FIG. 4A. A projecting piece 44, that comes in contact with a screw inside this screw hole 43a, is first formed on the plate 21. The screw has the dual function of electrically connecting the printed circuit 42 and plate 21, and of fixing the printed circuit 42 to the resin arm 20. A recess 29, that accepts the projection 28, is formed in the middle resin plate 20b as shown in FIGS. 2, 5A and 5B. A pair of fixing members 31 for a moving coil 30 is also formed on the middle resin plate 20b. As in the case of the sleeve 24, the moving coil 30 is fixed by thermoplastic resin when positioned by the fixing members 31 in a mold. The parts shown by ANSI 31 type hatching in FIGS. 1A indicate thermoplastic resin formed after the resin plates 20a–20c are formed.

Desirably, the moving coil 30 comprises a coil 30b wound on a coil bobbin 30a since, by using the coil bobbin 30a, deformations arising in the coil 30b when the thermoplastic resin is injected are prevented. However a coil without a bobbin may also be used. As the coil bobbin 30a is lightweight, it may be formed of the same thermoplastic resin as the resin plates 20a–20c.

Figure 6A:
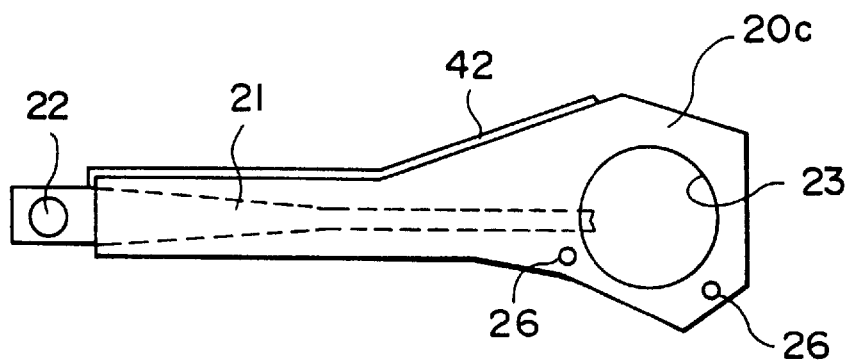
FIG. 6A is a plan view of a lower resin plate of the arm.
Figure 6B:
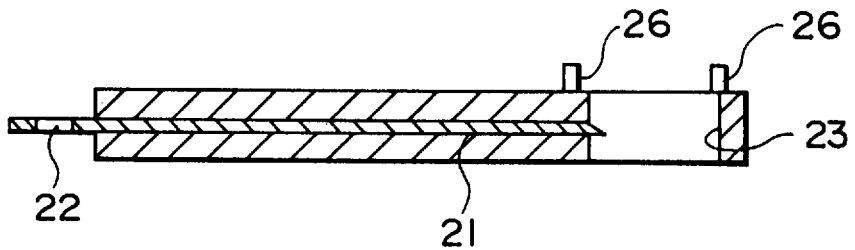
FIG. 6B is a sectional view of the lower resin plate.

The upper plate 20a and middle plate 20b are superposed on the lower plate 20c shown in FIGS. 6A and 6B such that the pin 26 engages with the engaging holes 27 as shown in FIG. 3. The assembly is thereby formed as the resin arm 20 of one-piece construction by the thermoplastic resin which fixes the sleeve 24.

Permanent magnets are disposed in the housing of the disk device such that they enclose the moving coil 30. As a result, when the moving coil 30 is energized, a magnetic force acts on the coil 30 according to Fleming's left-hand rule, the resin arm 20 rotates around the axis of the bearing 25, and the magnetic head is moved to a predetermined position on the magnetic disk.

The magnetic head reads data from the magnetic disk, and its detection signal is input to a control circuit of the magnetic disk device via the flexible printed circuit 42. The printed circuit 42 is connected to the plates 21 via grounding screws, so that the plates 21 are connected to ground via the electrically conducting shaft in contact with the inner circumference of the sleeve 24. However, the grounding screws may be in direct contact with the sleeve 24 without passing through the plates 21.

Due to the aforesaid construction, even if static electricity is generated between the resin arm 20 and the disk rotating at high speed, the charge is leaked to the housing through the plates 21, sleeve 24 and electrically conducting shaft. This therefore prevents the arm 20 from becoming charged with static electricity. Data read/write errors of the magnetic head due to static electricity are thereby avoided, and the actuator is made more lightweight and compact by the use of thermoplastic resin without losing any reliability of data processing.

As the plates 21 increase the rigidity of the resin plates 20a–20c, the resin plates 20a–20c may be made thinner than in the case where they are constructed of thermoplastic resin alone. Further, grounding of the printed circuit 42 is simply achieved by the screw in the screw hole 43a.

Figures 7A, 7B:
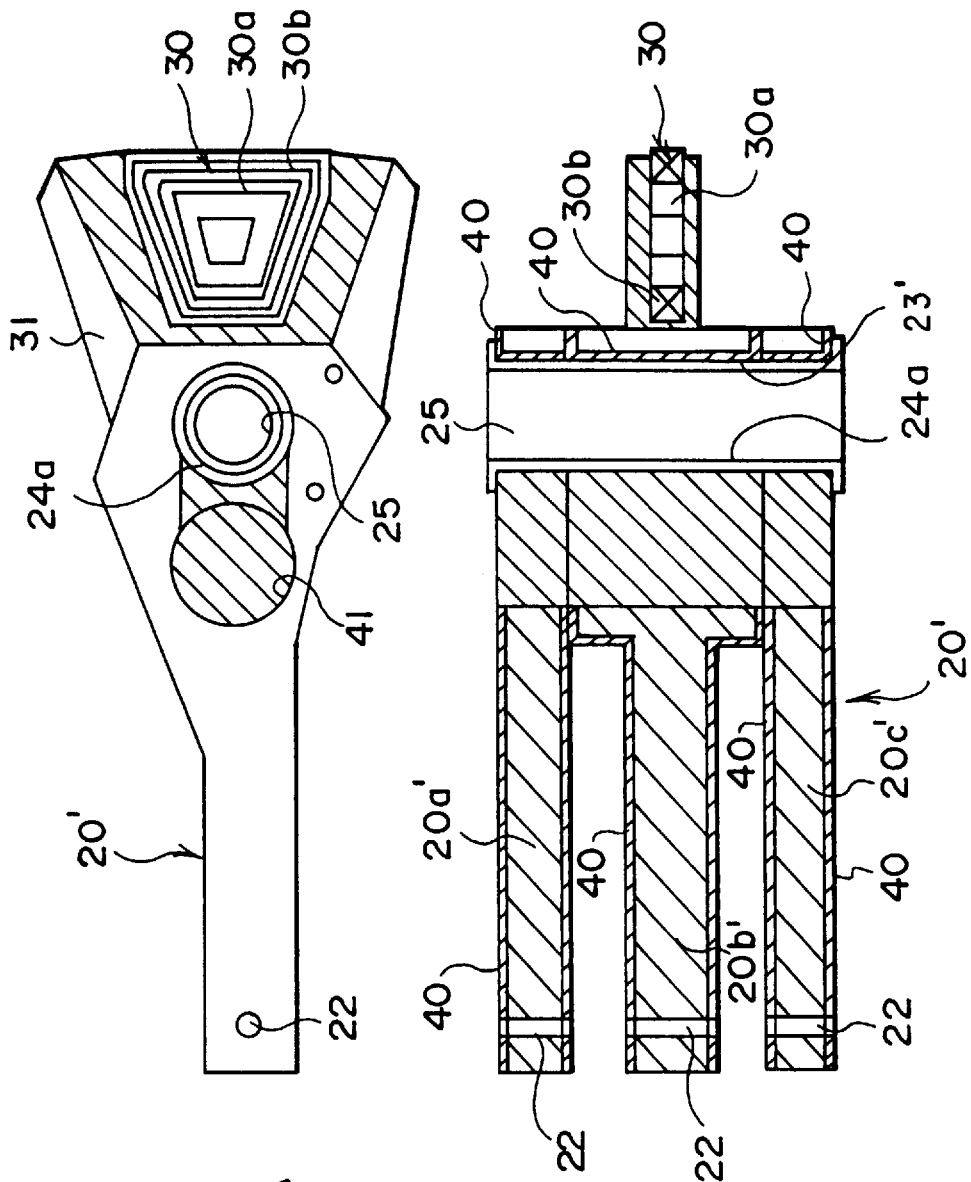
FIG. 7A is a plan view of an arm according to another embodiment of the invention.
FIG. 7B is a vertical sectional view of the arm of FIG. 7A.

FIGS. 7A–7B show an arm 20' of another embodiment of the present invention.

According to this embodiment, a metal film 40 is formed on surfaces of plates 20a'–20c' by non-electrolytic plating or vapor deposition in place of the plates 21 of the first embodiment. Static electricity is then prevented from accumulating on the plates 20a'–20c' by the contact of the film 40 with a sleeve 24a.

Flanges are formed at both ends of the sleeve 24a, and a hole 41 is provided inside of an axial hole 23' to assemble the sleeve 24a in the arm 20'. The hole 41 is formed with a slightly greater diameter than that of the flanges. The sleeve 24a is disposed at a predetermined position from the hole 41 inside the axial hole 23', and is formed into a one-piece construction with the arm 20' when thermoplastic resin is injected in the hole 41.

The fixing holes 22 of the magnetic head are formed by, for example, drilling the ends of the plates 20a'–20c' after finishing the metal film 40. The printed circuit 42 is attached to the side of the arm 20' by a screw, and is grounded via the metal film 40, sleeve 24a and the electrically conducting shaft in contact with the sleeve 24a.

The embodiments of this invention in which an exclusive property or privilege is claimed are defined as follows:

1. A resin molded actuator arm for rotatably supporting a reading head on a conductive shaft of a disk drive, said resin molded actuator arm comprising:

an arm member formed of a molded resin material:

said arm member having a first end for supporting said reading head;

said arm member having a second end defining an aperture;

a conductive bearing sleeve fixed in said aperture, said conductive bearing sleeve being adapted to rotatable support said arm member on said conductive shaft;

means for rotating said arm;

a flexible printed circuit, connectable to said reading head for carrying signals from said reading head, said flexible printed circuit extending from said first end at least to a point proximate said conductive bearing sleeve; and screw means, disposed at said point proximate said bearing sleeve, for electrically connecting said flexible printed circuit with said conductive bearing sleeve.

2. The actuator as defined in claim 1, further comprising conducting means including an electrically conducting plate formed within said arm member and contacting said conductive bearing sleeve and said screw means.

3. The actuator as defined in claim 1, further comprising conducting means including a metal film bonded on a surface of said arm member so as to connect said screw means with said conductive bearing sleeve.

4. An actuator as defined in claim 1, wherein said screw means has a further function of fixing said flexible printed circuit to said arm member.

5. A resin molded actuator arm for rotatably supporting a reading head on a conductive shaft of a disk drive, said resin molded actuator arm comprising:

an arm member formed of a molded resin material;

said arm member having a first end for supporting said reading head;

said arm member having a second end defining an aperture;

a conductive bearing sleeve fixed in said aperture, said conductive bearing sleeve being adapted to rotatably support said arm member on said conductive shaft;

means for rotating said arm; and a conductive film on said arm member for accepting connection to said reading head to provide a ground path, said conductive film extending from said first end to at least a point contacting said conductive bearing sleeve, to ground said reading head to said conductive shaft via said conductive bearing sleeve.

6. The resin molded actuator arm according to claim 5 wherein:

said conductive bearing sleeve has at least one flange disposed at an end thereof, said flange having a flange outer diameter greater than an outer diameter of said conductive bearing sleeve and said aperture; and said at least one flange makes electrical contact to said conductive film.

7. A method of producing a resin molded actuator arm for rotatably supporting a reading head on a conductive shaft of a disk drive, comprising the steps of:

molding an arm member using a resin material;

said arm member having a first end for supporting said reading head;

said arm member having a second end defining a first aperture having a first diameter, a second aperture having a second diameter larger than said first diameter, and a channel having a width equal to said first diameter connecting to said first aperture to said second aperture;

bonding a conductive film on said arm member for accepting connection to said reading head to provide a ground path, said conductive film extending from said first end to at least said first aperture;

providing a conductive bearing sleeve adapted to rotatably support said arm member on said conductive shaft, said conductive bearing sleeve having an outer diameter equal to or less than said first diameter and top and bottom flanges having outer diameters greater than said first diameter and less than said second diameter;

inserting said conductive bearing sleeve into said second aperture so that said top and bottom flanges are position above and below said first aperture, respectively;

disposing said conductive bearing sleeve in said first aperture via said channel such that at least one of said top and bottom flanges contacts said conductive film to ground said reading head to said conductive shaft via said conductive bearing sleeve; and molding resin in said second aperture, said channel and any space existing between an outer wall of said conductive bearing sleeve and an inner surface of said first aperture to fix said conductive bearing sleeve in said first aperture.

8. The method of claim 7 further comprising the steps of:

providing said arm member with a recess;

disposing at least a portion of said arm member having said recess in a mold and disposing a coil in said recess inside said mold; and molding resin in said recess to fix said coil in said recess.

9. The method of claim 8 further comprising the steps of:

providing said arm member with a recess;

disposing at least a portion of said arm member having said recess in a mold and disposing a coil in said recess inside said mold; and molding resin in said recess to fix said coil in said recess simultaneously with said molding resin in said second aperture, said channel and said any space existing between said outer wall of said conductive bearing sleeve and said inner surface of said first aperture.

* * * * *